United States Patent
Matsubara et al.

[11] Patent Number: 5,488,398
[45] Date of Patent: Jan. 30, 1996

[54] INK JET RECORDING APPARATUS CAPABLE OF EMPHASIZING THE DENSITY OF BLACK

[75] Inventors: Miyuki Matsubara, Tokyo; Hiromitsu Hirabayashi, Yokohama; Hitoshi Sugimoto, Kawasaki; Kiichiro Takahashi, Yokohama, all of Japan

[73] Assignee: Canon Kabushiki Kaisha, Tokyo, Japan

[21] Appl. No.: 923,390

[22] Filed: Aug. 3, 1992

[30] Foreign Application Priority Data

Aug. 1, 1991  [JP]  Japan ................................ 3-193189

[51] Int. Cl.$^6$ ........................................ B41J 2/01
[52] U.S. Cl. ................................. 347/43; 347/41
[58] Field of Search ................ 346/140 R; 347/43, 347/41, 40

[56] References Cited

U.S. PATENT DOCUMENTS

| | | | |
|---|---|---|---|
| 4,575,730 | 3/1986 | Logan | 346/140 R |
| 4,631,568 | 12/1986 | Milbrandt | 346/140 R |
| 4,963,882 | 10/1990 | Hickman | 346/140 R |
| 4,967,203 | 10/1990 | Doan et al. | 346/140 R |
| 5,142,374 | 8/1992 | Tajika et al. | 358/298 |
| 5,220,342 | 6/1993 | Moriyama | 346/140 R |
| 5,237,344 | 8/1993 | Tasaki et al. | 346/140 R |

FOREIGN PATENT DOCUMENTS

| | | |
|---|---|---|
| 0331481 | 9/1989 | European Pat. Off. . |
| 0455389 | 11/1991 | European Pat. Off. . |
| 58-173669 | 10/1983 | Japan . |
| 63-264358 | 11/1988 | Japan . |
| 93367 | 4/1989 | Japan . |
| 193367 | 4/1989 | Japan . |
| 1129502 | 6/1991 | Japan . |
| 129502 | 6/1991 | Japan . |
| 9010541 | 9/1990 | WIPO . |

OTHER PUBLICATIONS

Official Search Report for Eur. Pat. Appln. No. 92307001.5.

*Primary Examiner*—N. Le
*Attorney, Agent, or Firm*—Fitzpatrick, Cella, Harper & Scinto

[57]  ABSTRACT

This specification discloses an ink jet recording apparatus in which the density of black can be emphasized as compared with that of the other colors, with time cost, hue and blur in the boundary between different colors being suppressed, and wherein when ink is impacted from a multihead to all picture elements in a predetermined area, discharge by a plurality of multinozzles is effected to an image datum at the same position and in the same scan with an amount of ink per discharge for which the area factor in the area is less than 100% and the amount of ink per discharge from a multihead for one color is made greater than that for the other colors.

31 Claims, 13 Drawing Sheets

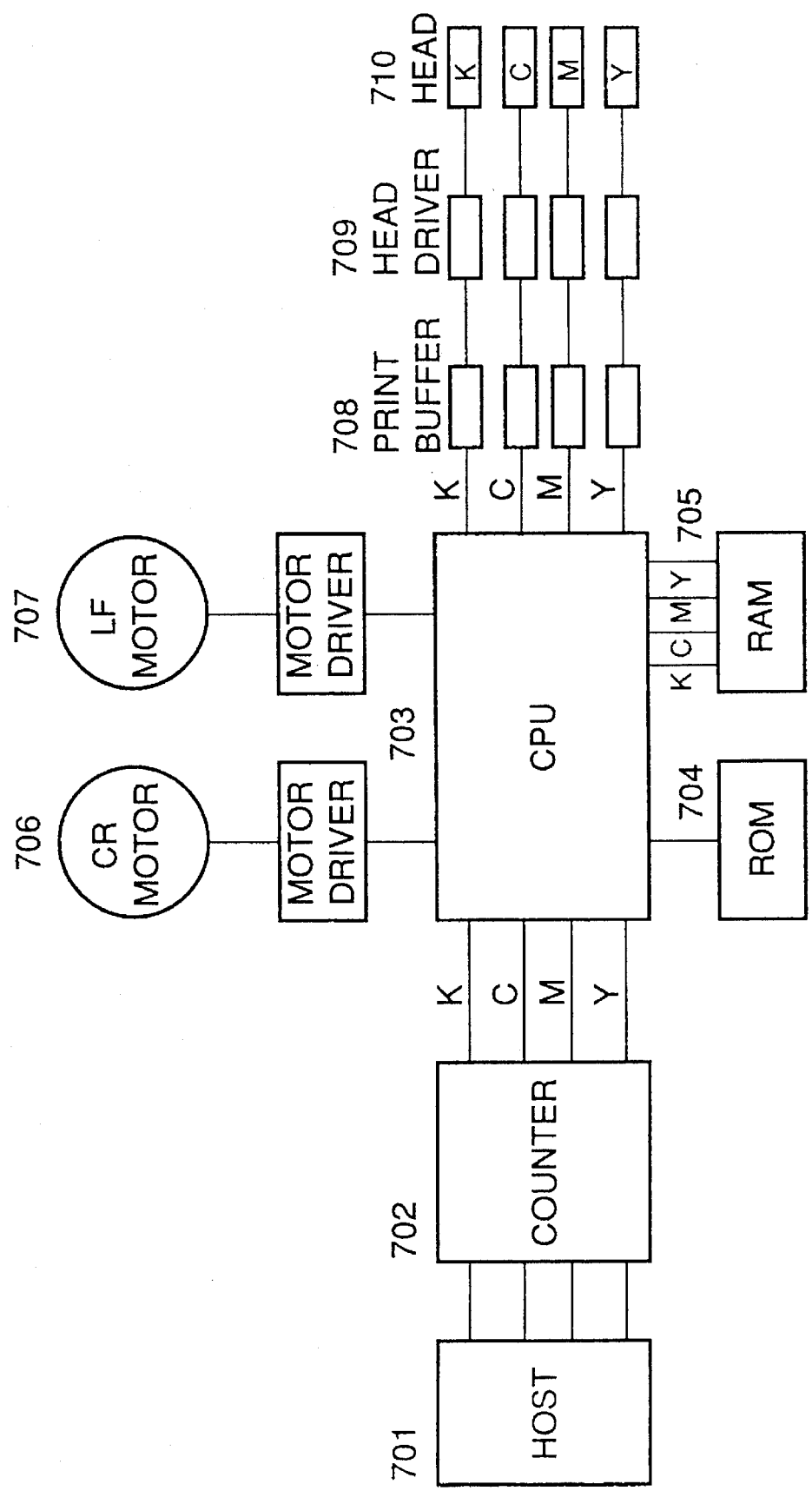

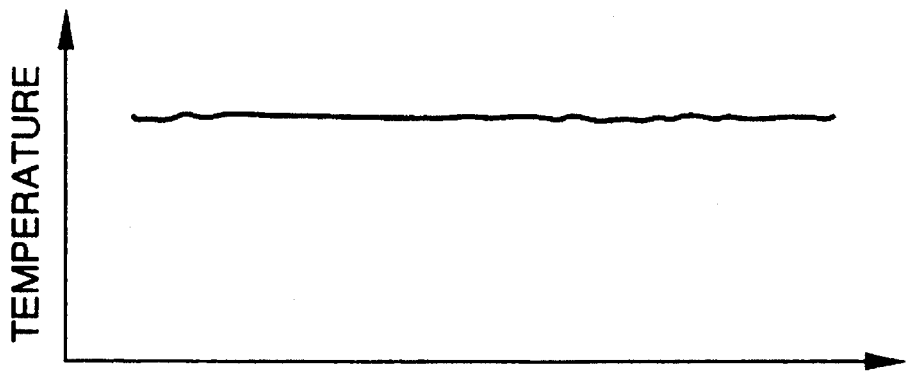
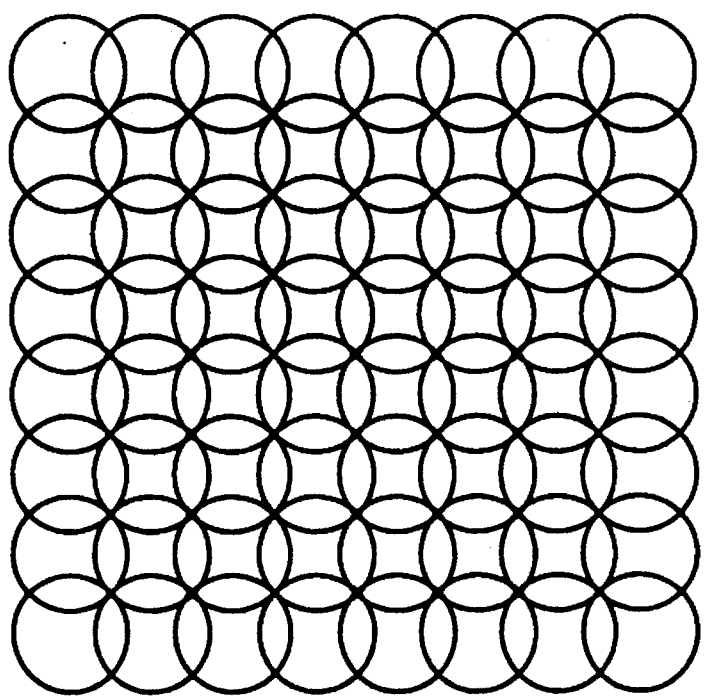
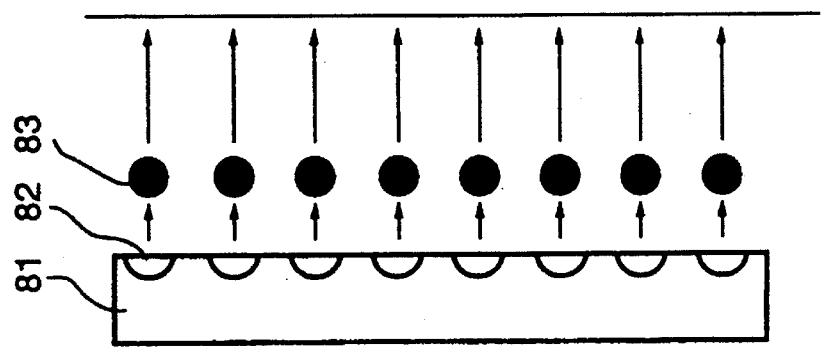

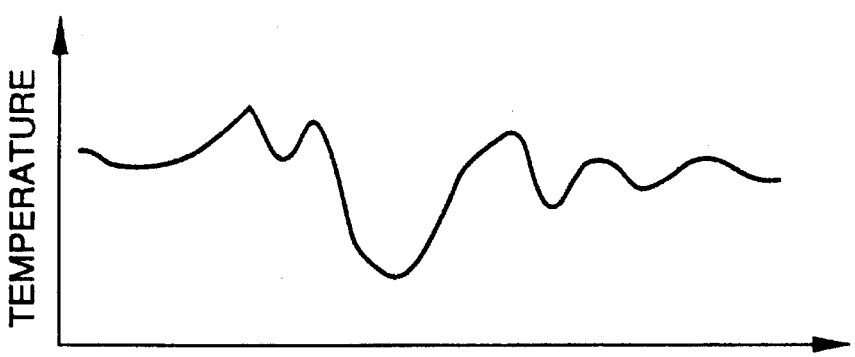
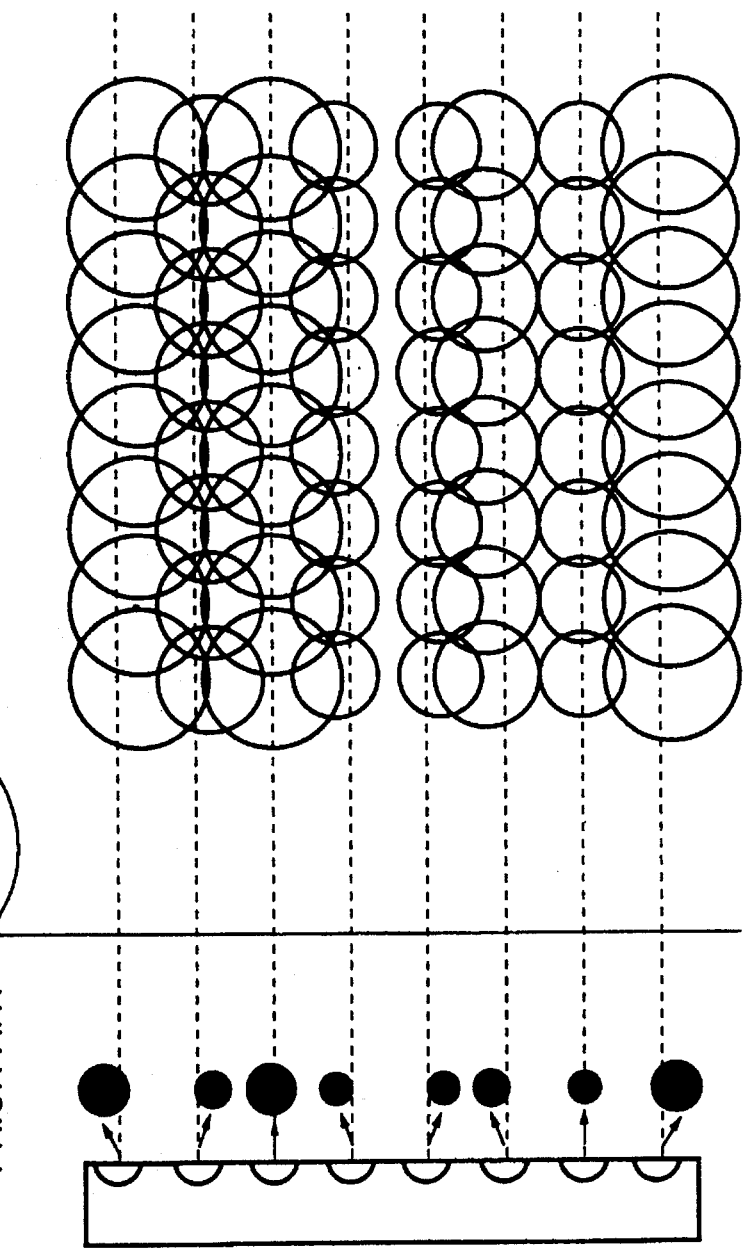

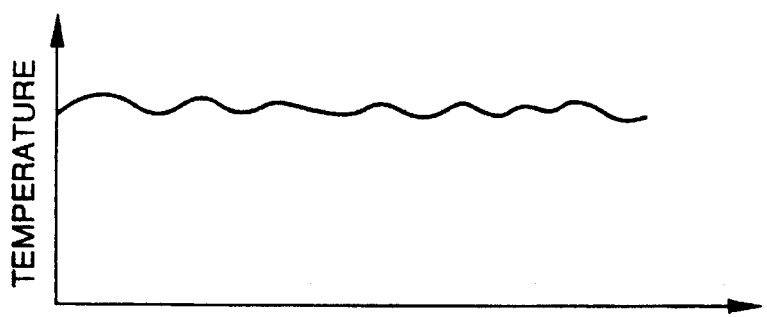
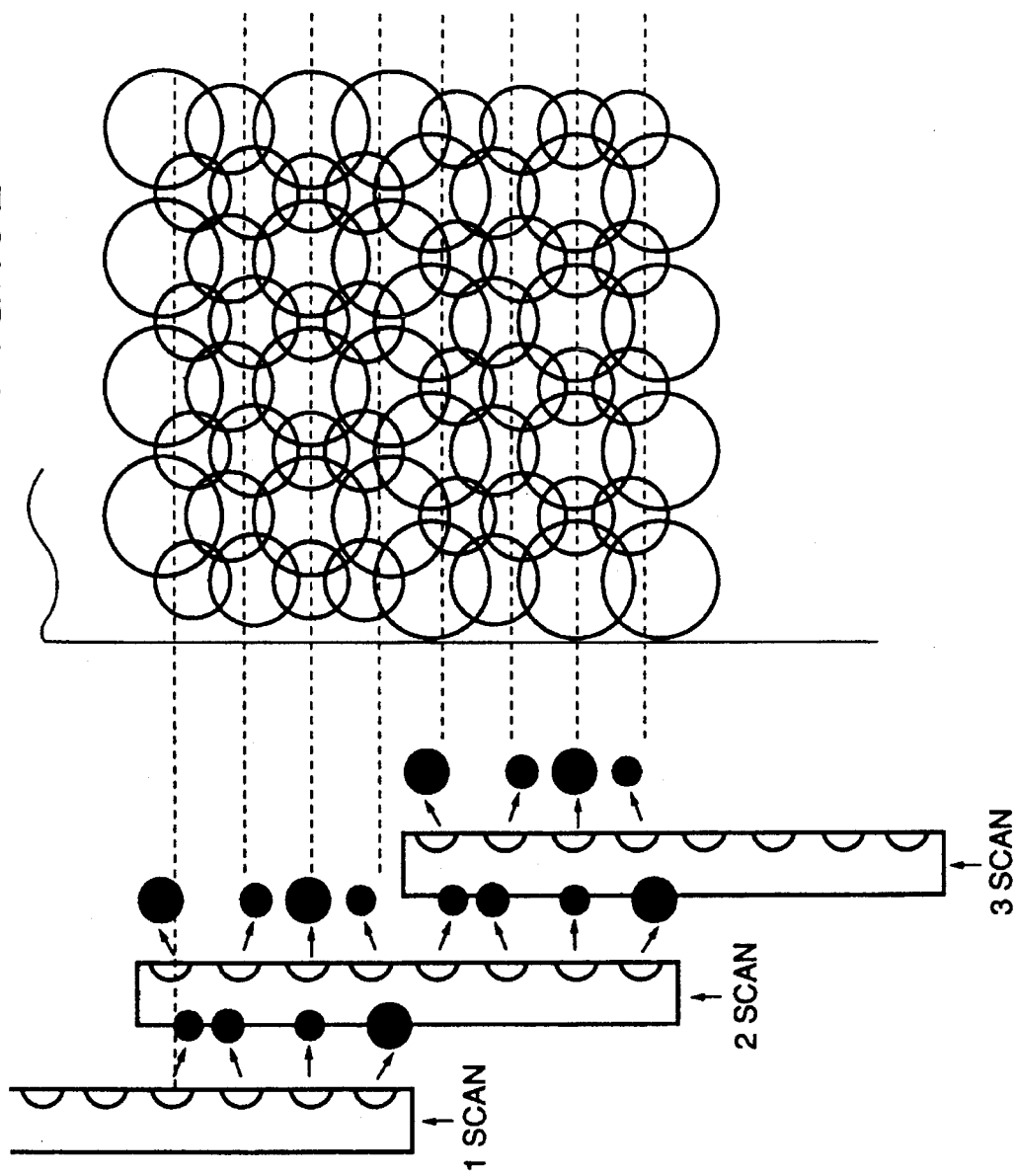

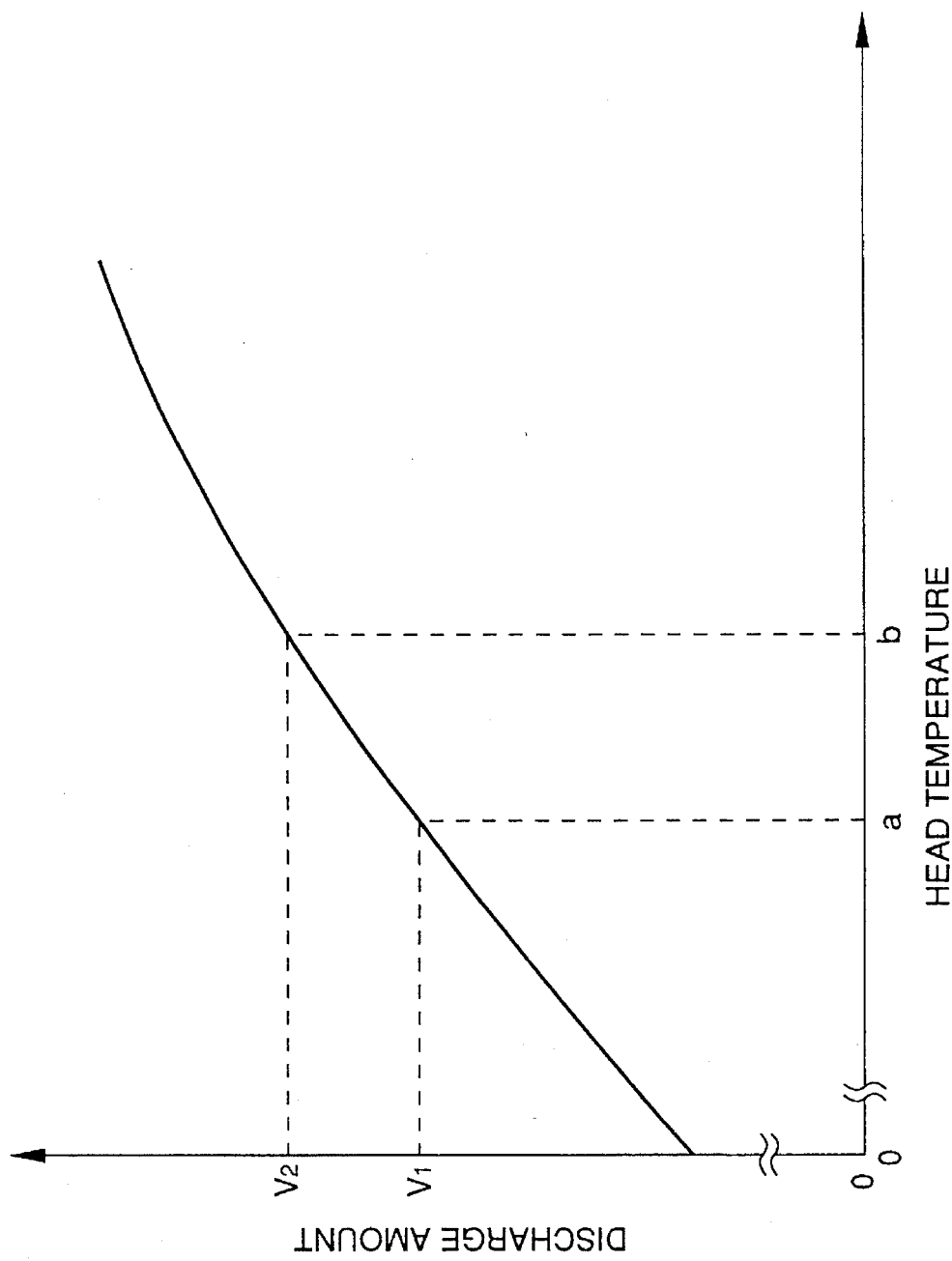

INK JET RECORDING APPARATUS CAPABLE OF EMPHASIZING THE DENSITY OF BLACK

BACKGROUND OF THE INVENTION

1. Field of the Invention

This invention relates to a printing method in an ink jet recording apparatus.

2. Related Background Art

With the spread of copying apparatuses, information processing instruments such as word processors and computers, and further, communication instruments, there is going on the rapid spread of apparatus which effect digital image recording by the use of a recording head of the ink jet type as image forming (recording) apparatuses for those instruments. Further, with the tendency of the information instruments and communication instruments toward multicoloring and lower costs, the demand for recording apparatuses coping with multicoloring and printing on plain paper has been increasing. Among such recording apparatuses, popular ones are those which, for the improvement in recording speed, use, as a recording head comprising a plurality of recording elements integrated and arranged (hereinafter referred to as the multihead), a head in which a plurality of discharge ports and a plurality of liquid paths communicating therewith are integrated as ink discharge portions and which is provided with a common liquid chamber for temporarily storing therein ink to be supplied to each of the discharge portions, and which are provided with a plurality of such multiheads to cope with colors.

FIG. 5 of the accompanying drawings shows the construction of a printer unit when printing is effected on paper by the multihead. In this figure, the reference numeral 501 designates ink cartridges. These ink cartridges are comprised of ink tanks filled with inks of four colors, i.e., black, cyan, magenta and yellow, respectively, and a multihead 502. FIG. 6 of the accompanying drawings shows the manner in which multinozzles are arranged on the multihead from a direction z, and in FIG. 6, the reference numeral 601 denotes multinozzles arranged on the multihead 602. Turning back to FIG. 5, the reference numeral 503 designates a paper feeding roller which is rotated in the direction of arrow to feed printing paper 507 in a direction y while holding down the printing paper 507 with an auxiliary roller 504. The reference numeral 505 denotes a paper supply roller which effects the supply of the printing paper and also performs the function of holding down the printing paper 507, like the rollers 503 and 504. The reference numeral 506 designates a carriage for supporting the four ink cartridges and moving these cartridges with printing. This carriage 506 is designed to stand by at a home position (h) indicated by dotted line when printing is not being effected or when the recovery operation or the like of the multihead is effected.

The carriage 506, which is at the home position before printing is started, effects printing on the paper over a width D by n multinozzles 601 on the multihead 502 while being moved in the direction x when a printing starting command comes to it. When the printing of data is terminated to the end portion of the paper, the carriage is returned to the home position, and again effects printing in the direction x. By the time when the second printing is started after the first printing has been terminated, the paper feeding roller 503 is rotated in the direction of arrow, whereby the paper is fed by the width D in the direction y. In this manner, printing and paper feeding by the multihead width D are repeated during each scan of the carriage, whereby the printing of data on the paper is completed.

In such a printer coping with colors, it is usual that the ink discharge amount per dot is designed uniformly for all colors in order to keep color balance. Further, when printing is effected singly with each color to cope with the blur in the boundary portion between different colors which poses a problem during plain paper printing, it is sometimes the case that printing is completed in a state in which the area factor cannot satisfy 100% even when in a predetermined area, discharge is effected with printed data of 100% duty (solid). However, such designing of the discharge amount is based on the color image data and therefore, where the apparatus is used as an ordinary monochrome printer, density unavoidably becomes low on characters and ruled lines, and this has led to a problem that the print lacks in clarity.

In order to solve this problem, there has been proposed a method whereby the multihead is scanned twice each for the same area and in the second scan, black alone is printed. If this is done, only the black ink of an amount double that in the ordinary case is impacted and therefore, a corresponding increase in density becomes possible.

In this method, however, the multihead must be scanned to the same position twice each to emphasize the black position and thus, time cost double that for ordinary printing will be required.

So, in order to further speed up this emphasis of black, applicant proposed a method of printing inks of the other colors at the black image data position during the same scan as that for black (U.S. patent application Ser. No. 685,210). If this is done, the black dye of an amount several times as great as that is the ordinary case can be provided at the same impact point by only one scan.

In this manner, it has been possible to emphasize the density of black at the same time cost as that in the ordinary case.

However, if the above-described method is intactly used, the area factor will exceed 100%, but the discharge amounts of the other colors will become great as compared with the discharge amount of black and therefore, the hue of color will become different from black. Also, if the above-described method is intactly used for plain paper, the great problem of the "blur in the boundary portion between different colors" encountered when coping with plain paper will tend to the further aggravated. This problem depends on the amount of ink impacted against a predetermined area at one time. Accordingly, if as in the above-described method, an amount of ink several times as great as that during ordinary printing is shot on the same impact point at the same time, the ink which cannot be absorbed in a vertical direction on plain paper will expand in a horizontal direction and go to blur in the area to be printed with the other colors.

SUMMARY OF THE INVENTION

The present invention has been made in order to solve the above-noted problems and the object thereof is to provide an ink jet recording apparatus which can emphasize the density of black as compared with the other colors, with the time cost, the hue of color and the blur in the boundary between different colors being suppressed.

In order to solve the above-noted problems, the present invention provides an ink jet recording apparatus provided with a plurality of multiheads for discharging ink droplets from a plurality of multinozzles to thereby effect recording in which for one image datum, discharge is effected to the same position and in the same scan by said plurality of multinozzles and the amount of ink per discharge from the multihead of one color is made greater than that for the other colors, whereby the density of black can be emphasized as compared with the other colors, with the time cost, the hue of color and the blur in the boundary between different colors being suppress ed.

BRIEF DESCRIPTION OF THE DRAWINGS

FIG. 7 is a block diagram showing a construction for automatically discriminating between a color graphic mode and a monochromatic character mode.

FIGS. 8A–8C show an example of the printing by the multihead.

FIGS. 9A–9C show an example of the printing by the multihead.

FIGS. 10A–10C illustrate divisional printing in Embodiment 1.

FIG. 12 is a graph showing the relation between the head temperature and the discharge amount of Embodiment 1.

DESCRIPTION OF THE PREFERRED EMBODIMENTS

Some embodiments of the present invention will hereinafter be described in detail with reference to the drawings.

(Embodiment 1)

Figure 1A:
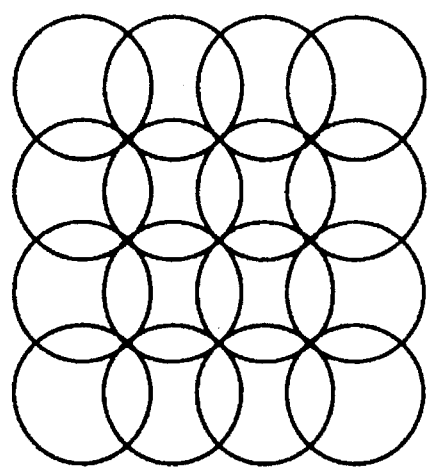
FIGS. 1A to 1C the printing state of Embodiments 1 and 2 of the present invention.
Figure 1B:
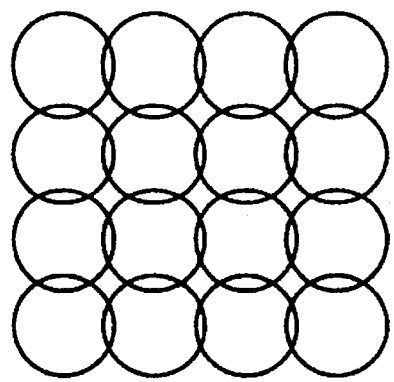

Embodiment 1 will first be described. Usually in the case of coated paper, the blur in the boundary portion between different colors does not pose a problem so much as in the case of plain paper and the blurring rate is largish and therefore, the discharge amount is designed such that as shown in FIG. 1A, even adjacent dots disposed on diagonals overlap each other, and is in a state in which the area factor 100% is satisfied. The discharge amount in this state is designed to be 24.0 pl/dot. However, the ink jet printer according to the present embodiment corresponds to the color of plain paper and therefore, in the ordinary color graphic printing state, the discharge amount is designed to a state in which as shown in FIG. 1B, the area factor does not satisfy 100%. In the present embodiment, the blurring rate $\alpha=2.0$ for plain paper is supposed and the discharge amount is designed to 20.0 pl/dot such that in this state, adjacent dots partly overlap each other and dots at diagonal positions do not overlap each other. The printing density is 360 dpi (the distance between picture elements is 70.5 μm).

Consequently, if monochromatic characters are printed in such a state of the discharge amount, the density of black will become considerably low as compared with that in a monochromatic printer corresponding to ordinary plain paper and thus, the resultant image will become undesirable as a monochromatic image.

In the present embodiment, data transferred to a buffer in the printer are counted, and whether the data have c, m and y data mixed therewith or whether the data consist of black data alone is judged by a CPU, and on the basis of the judgment, the monochromatic character mode or the color graphic mode is automatically discriminated and executed.

FIG. 7 shows an electrical block diagram for effecting the above-described control. In this figure, the reference numeral 701 designates a host which sends an image data signal to the ink jet recording apparatus, and the reference numeral 702 denotes a counter which constitutes a portion of a signal receiving circuit and counts the number of data input thereto, whereby input data signals are input to the CPU by colors k, c, m and y. Data of each color is input to the counter 702 for each one line (each one raster) or each one picture element (each one dot). The reference numeral 704 designates an ROM storing the sequence of this ink jet printer therein, and the reference numeral 705 denotes an RAM for memorizing therein each data input from the counter 702 to the CPU 703. The CPU 703 processes the data input to the RAM 705, in accordance with the sequence written in the ROM 704, and sends a driving command to a carriage (CR) motor 706, a paper feeding (LF) motor 707 and heads 710 of four colors through the respective drives thereof. The CPU 703 also carries out processes such as the production of data resulting from recording data being thinned at a predetermined thinning rate, and the control of the discharge amount.

A print buffer 708 stocks therein data of each one line to be printed by the heads. In the case of the present embodiment, design is made such that data for one page sent from the host can be memorized in the RAM 705. Accordingly, if any of the color data c, m and y is input by the counter 702, that is, at least one color datum exists in one page, by the time when the RAM 705 is filled up with memory, the CPU 703 judges this to be the color graphic mode. On the other hand, if c, m and y are not counted at all and all the input data are black alone, the CPU 703 automatically judges this to be the monochromatic character mode, and reads a sequence conforming to each mode from the ROM 704 and sends a driving command.

As the color graphic mode, the divisional printing method will first be described with reference to FIGS. 8 to 11. This divisional printing is effective for the blur in the boundary between different colors in plain paper and the density irregularity in the heads attributable to the irregularity of the multinozzles, and is such that image data to be printed in a unit area are printed twice in the same area. In FIG. 8(a), the reference numeral 81 designates a multihead which is similar to that of FIG. 7, but now, for simplicity, it is to be understood that this multihead is comprised of light multinozzles 82. The reference numeral 83 denotes ink droplets discharged by the multinozzles 82. Usually, it is ideal that ink is discharged in a uniform discharge amount and in a uniform direction as shown in FIG. 8(a). If such discharge is effected, dots of a uniform size will be shot on paper as shown in FIG. 8(b) and uniform images generally free of density irregularity will be obtained (FIG. 8(c)).

Actually, however, as previously described, each nozzle has its own irregularity and if printing is effected in the same manner as described above with such irregularity left, irregularity will occur to the size and direction of the ink droplets discharged from the respective nozzles as shown in FIG. 9(a), and the ink droplets will be shot on the paper as shown in FIG. 9(b). This figure shows that large blank portions exist periodically relative to the main scanning direction of the head or conversely, dots overlap one another more than necessary or such a blank streak as seen in the middle of this figure is created. The aggregate of the dots shot in such a state assumes a density distribution shown in FIG. 9(c) relative to the direction of arrangement of the nozzles, with a result that as long as they are seen by human eyes, these phenomena are sensed as density irregularity.

So, as a countermeasure for this density irregularity, printing is effected in a method which will be described below. The method will hereinafter be described with reference to FIGS. 10 and 11. According to this method, the multihead 81 is scanned three times to complete the printing area shown in FIGS. 8 and 9, but the area of four-picture-element unit corresponding to half thereof is completed by two passes. In this case, the eight nozzles of the multihead is divided into two groups of upper four nozzles and lower four nozzles, respectively, and the dots printed by one nozzle in one scan are prescribed image data thinned to about half by the processing by the CPU in accordance with a predetermined image data arrangement (the cross pattern shown in FIG. 11). Dots are buried into the remaining half image data during the second scan (the counter-cross pattern shown in FIG. 11) to thereby complete the printing of a four-picture-element unit area. The recording method as described above will hereinafter be referred to as the divisional printing method.

In the present embodiment, the divisional printing method is used in the color graphic mode. In the foregoing description, an 8-nozzle head has been used, but actually, a 64-nozzle head is used. Accordingly, this head is divided into two groups of 32 nozzles each, and paper feeding is effected by an amount corresponding to 32 picture elements. Thus, a printing area is completed for a 32-picture-element unit each. Thereby, in the color graphic mode, the blur in the boundary between different colors which poses the greatest problem in plain paper color can be prevented and also, the density irregularity in the head by the irregularity of the multinozzles can be alleviated and a good color graphic image can be obtained even on plain paper.

However, if as described above with respect to the prior art, the printing of monochromatic characters is effected with this color graphic mode left as it is set, the density of black will be low correspondingly to the small discharge amount set and further, the time cost will become double correspondingly to the divisional thinning printing being effected, as compared with a monochrome printer corresponding to ordinary plain paper.

In the present embodiment, as previously described, the monochromatic character mode exclusively for monochromatic character data is provided independently of the color graphic mode. In this mode, the density irregularity in the head poses no particular problem in printing characters, and the blur in the boundary portion between different colors poses no problem because the printing in this mode is the printing of black alone. Consequently, to obtain high density of black without requiring a time cost, it is preferable that as much ink as possible be impacted against the same data position at one time.

Figure 1C:
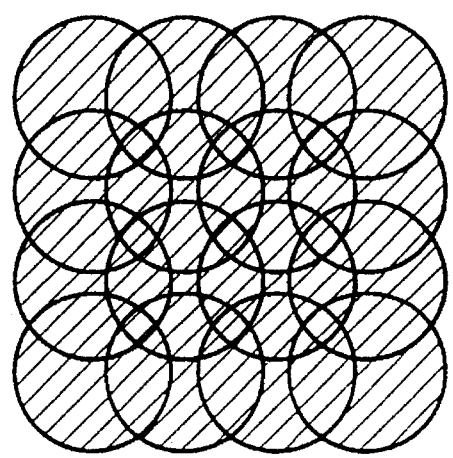

So, in the present embodiment, in order to satisfy this condition, divisional printing is not effected in the monochromatic character mode, but besides black, the printing of c and m is effected for the black image data position during the same scan. However, the discharge amount of ink c and m is 20.0 pl/dot, less than the discharge amount of black ink. The reason why c and m have been chosen is that blue, a mixture of c and m, is a color considerably low in brightness of color and approximate to black. Also, the reason why the amounts of c and m have been made small is for the purpose of reducing the hue of blue as compared with black. By doing so, the amount of ink impacted against the black position becomes (24.0+20.0×2=64.0) pl/dot, and this satisfies the amount of impacted ink in an ordinary monochrome printer, i.e., the area factor as shown in FIG. 1C, and it is possible to increase density by one scan printing. Further, the hue of blue which poses a problem when printing is effected with black, c and m discharged in the same amount can be solved. Also, recording with other color superposed on the same data position can be accomplished by supplying the data of black print to other head, and this process is carried out by the CPU 703 which sends a command to each head driver.

Description will now be made of a method of setting the discharge amount of black alone to a discharge amount greater than that of the other colors by the utilization of controlled temperature. FIG. 12 is a graph showing the head temperature and the then discharge amount for printing, and as shown in this figure, the higher becomes the head temperature, the higher becomes the discharge amount. That is, as long as the head temperature is within a range controllable by controlled temperature, a desired discharge amount for each color can be obtained in any environment. So, in the present embodiment, the controlled temperature of black is b and that of the other colors is a, lower than b. A discharge amount V1 is provided by the head temperature a, and a discharge amount V2 (>V1) is provided by the head temperature b. This value V2 is set to the vicinity of a value which prevents blur best in the range within which the density of black satisfies its desired value, i.e., a maximum value less than the area factor 100%. If the respective heads have not reached their respective temperatures a and b, heat is applied to the heads.

Figure 13:
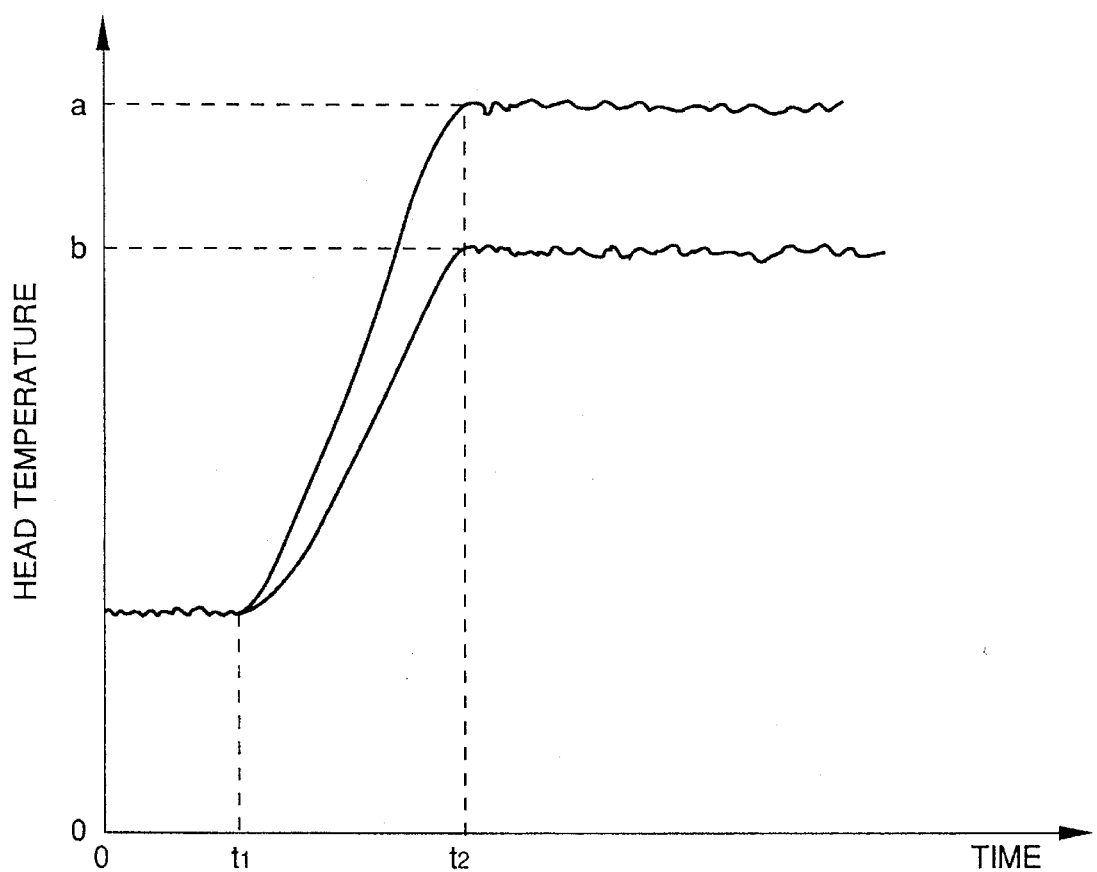
FIG. 13 is a graph showing the state of the head temperature rise by the head temperature control during the starting of printing.

FIG. 13 shows the heating time and the state of the head temperatures in this case from before the start of printing. At the moment when a printing starting button is depressed (t1), head temperature sensors sense the temperatures of the respective color heads, and the heads are heated to the lower limit values (a and b) of the allowable printing temperature. At this time, the power of the heater for black alone is made great to thereby make the gradient of the temperature rise great, and it becomes possible to uniformize the accomplishing time (t2) up to the controlled temperature at which printing can be started. Thereafter, printing is effected while the temperatures are controlled within the respective allowable printing ranges. By doing so, printing can be effected always at a stable discharge amount and the discharge amount of black can be made great relative to that of the other colors.

By providing such monochromatic character mode and color graphic mode independently of each others and providing the electrical means as shown in FIG. 7 which judges and executes them, blur-free images can be obtained even on plain paper in the color graphic mode, and also in the monochromatic character mode, there can be obtained images which are high in the density of black and good in the hue of color as in the prior art.

In the present embodiment, in order to select monochromatic character data and color graphic data, setting is made such that all the data of one page are checked up and the printing mode is automatically changed over at one-page unit. However, it is often the case that color graphic and monochromatic characters partly exist in the data of one page. In such a case, if all data are printed in color graphic, much time cost will be required and the density of characters will become low. Accordingly, use may be made of a method whereby the CPU 703 checks up the data each line by the counter 702 and automatically changes over these modes for each line.

In the present embodiment, a method utilizing controlled temperature has been shown as the method of controlling the discharge amount, whereas this is not restrictive, but use may be made of a method utilizing a driving signal which will be shown in the next embodiment.

Use may further be made of a method whereby the user can select to which mode the recording apparatus of the present invention should be set during each cycle of printing, by the dip switch of the apparatus.

Also, the divisional printing method has been described in the color image recording by the present embodiment, but even if use is made of the prior-art system in which recording is effected on the same area a plurality of times, the problems of the density of black and time cost will be eliminated.

(Embodiment 2)

Embodiment 2 will now be described with reference again to FIG. 1. This embodiment will be described with respect to a case where it is better in respect of the blur of ink than Embodiment 1. In the case of the present embodiment, FIG. 1A shows a state in which black and the other colors which are not emphasized (c, m and y) are printed at the image data position, and in this state, unlike Embodiment 1, adjacent dots overlap each other and the area factor 100% is satisfied. Usually, in ordinary printers, the discharge amount is designed on the basis of the area factor like this. Accordingly, again in the present embodiment, such printing is effected with cyan, magenta and yellow which are not particularly emphasized being made equal in discharge amount. FIG. 1B shows a state in which ink droplets of the other three colors than black which is emphasized are printed at the black image data position. However, the printing of such three colors for emphasizing black is effected in all colors at the same position whereat the black image data exist. Accordingly, actually, as in Embodiment 1, there is brought about a shot state in which the area factor is considerably great as shown in FIG. 1C.

In the present embodiment, it is intended that when printing shot is effected in each color singly, the four colors are superposed one upon another in such a discharge amount that as shown in FIG. 1B, the area factor cannot satisfy 100% and blank portions are left, whereby the printed state as shown in FIG. 1C is obtained to thereby obtain a black image of high density while the blur of ink is prevented as much as possible.

To realize the printing described above, black can always be set to a discharge amount only for effecting the shot shown in FIG. 1A, while for the other three colors c, m and y, the two kinds of discharge amounts shown in FIGS. 1A and 1B must be made variable. PWM control which is conceivable as a method therefor will hereinafter be described.

Figure 2:
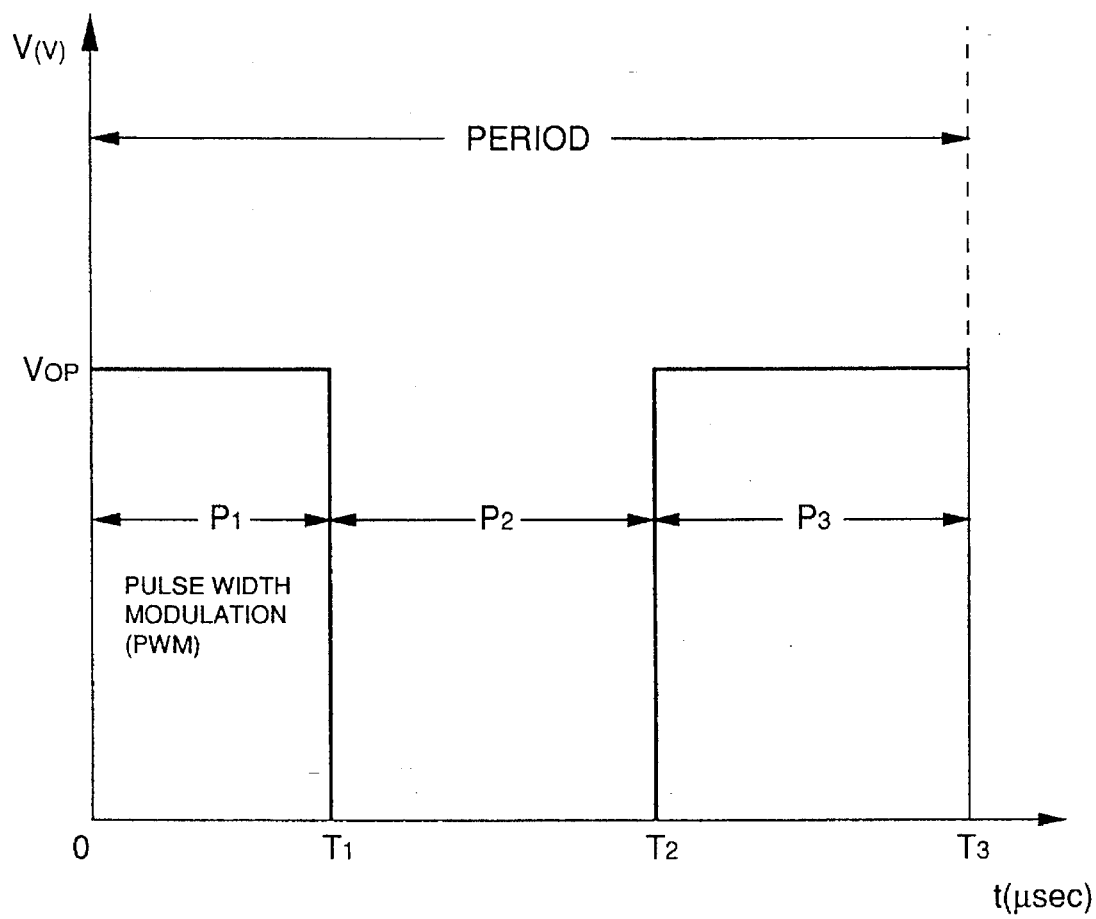
FIG. 2 illustrates PWM control in Embodiments 1 and 2 of the present invention
Figure 3:
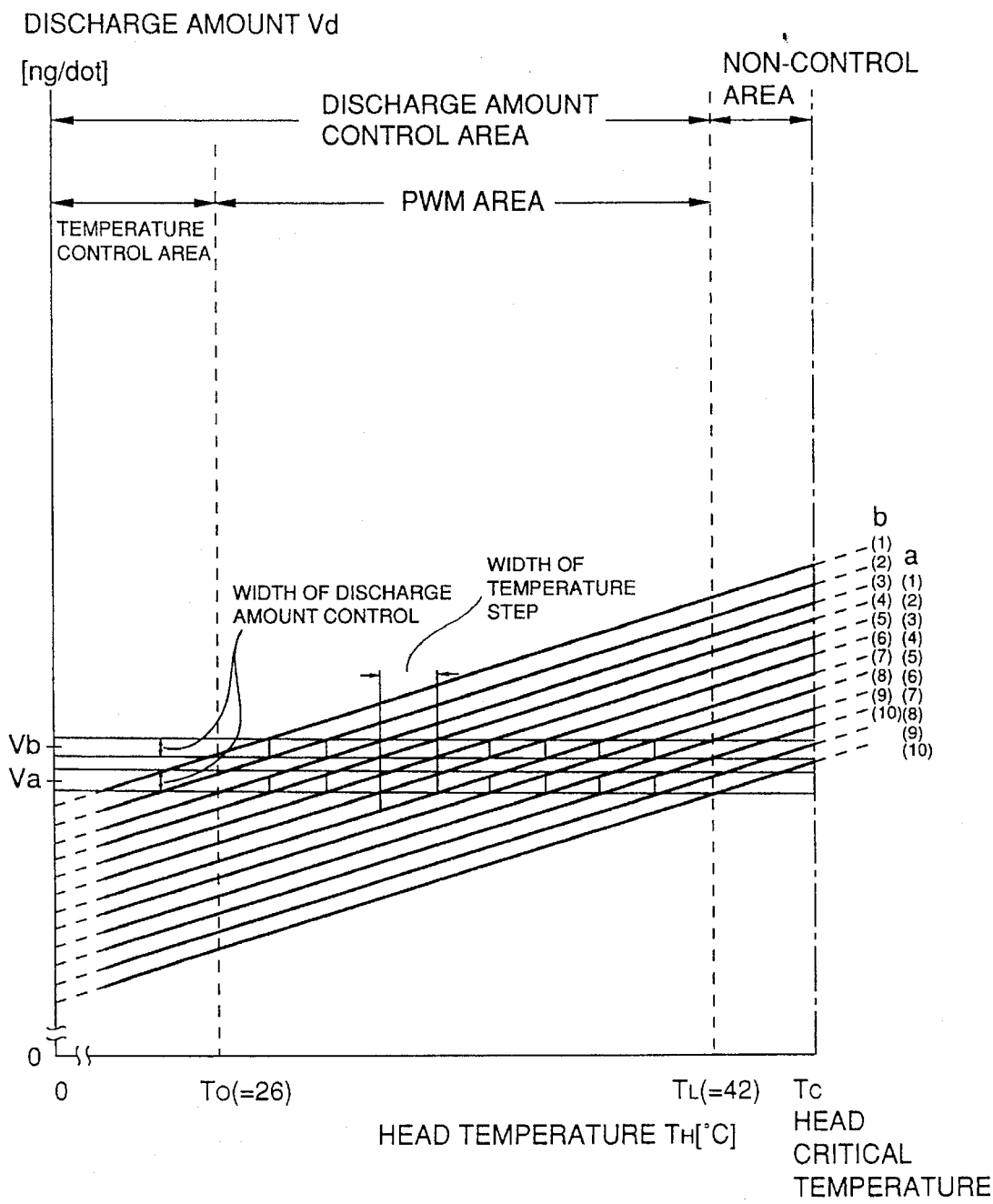
FIG. 3 illustrates the temperature control of PWM control.

PWM control is a method of controlling a first pulse width of a double pulse imparted to the head during the discharge driving thereof. Tables I and II below explain temperature control in PWM control. In FIG. 2, P1 designates a preheat pulse which effects PWM, and P3 denotes a main heat pulse placed after an interval pulse P2. By this pulse P3, the ink is discharged from the multihead, and how much the head has been warmed by the pulse P1 at this time greatly affects the discharge amount. Usually, by such PWM control being effected, the stabilization of the discharge amount conforming to the temperature change of the head is accomplished. That is, by the pulse width of the preheat pulse P1 being modulated in conformity with the temperature change of the head, the stabilization of the discharge amount by the main heat pulse P3 is accomplished. Two kinds of pulse width tables corresponding to the head temperature are shown in Tables I and II, and as shown in FIG. 3, this PWM control is effected in an area wherein the discharge amount is in a substantially linear relation to the head temperature. In Table I, the discharge amount is always set to a discharge amount Va, and in Table II, the discharge amount is set to a discharge amount Vb. Vop is a driving voltage.

TABLE I

| Conditions | Table No. | | | | | | | | | |
|---|---|---|---|---|---|---|---|---|---|---|
| | [1] | [2] | [3] | [4] | [5] | [6] | [7] | [8] | [9] | [10] |
| Head Temperature $T_H$ [°C.] | less than 26 | higher than 26, less than 28 | 28 — 30 | 30 — 32 | 32 — 34 | 34 — 35 | 35 — 38 | 38 — 40 | 40 — 42 | higher than 42 |
| Preheat Pulse Width P1 [Hex] | 0A | 09 | 08 | 07 | 06 | 05 | 04 | 03 | 02 | 01 |

TABLE II

| Conditions | Table No. | | | | | | | | | |
|---|---|---|---|---|---|---|---|---|---|---|
| | [1] | [2] | [3] | [4] | [5] | [6] | [7] | [8] | [9] | [10] |
| Head Temperature $T_H$ [°C.] | less than 26 | higher than 26, less than 28 | 28 — 30 | 30 — 32 | 32 — 34 | 34 — 36 | 36 — 38 | 38 — 40 | 40 — 42 | higher than 42 |
| Preheat Pulse Width P1 [Hex] | 0B | 0A | 09 | 08 | 07 | 06 | 05 | 04 | 03 | 02 |

If temperature can be detected like this and the discharge amount can be stabilized by table setting, the target value of the discharge amount can be changed between Va and Vb by changing the table contents between Tables I and II also shown in Tables I and II. In the present embodiment, in the control of c, m and y heads, PWM Table I and II are changed to change the discharge amount, thereby effecting printing in the state as shown in FIG. 1.

That is, in the c, m, y and bk heads, (1) at a position whereat there are black data and there are no c, m and y data, the discharge of FIG. 1A is effected by the bk head and the discharge of FIG. 1B is effected by the c, m and y heads, on the basis of the bk data, and (2) at a position whereat there are c, m and y data independently of the black image data, the discharge of FIG. 1A is effected by the c, m and y heads in conformity with the respective data.

By effecting such printing, there can be obtained an image free of time cost and having high density of black, and further and further an image having a good hue of black.

Like this, the width of PWM control may be used more effectively to set the tables and discharge amounts of the respective colors independently of one another. Ideally, it is preferable that if the same amounts of c, m and y inks are mixed together, it result in a color equal to black ink, but actually, it is usual that the color balance is inclined to either side. When such an inclination is especially remarkable, the discharge amounts of c, m and y may be set to such a rate that the color of the mixture of these three kinds of inks becomes approximate to black, whereby the above-described black-emphasized printing may be effected, or use may be made of a method whereby in Embodiment 1, only c and m are used for the emphasis of black. Also, the control by controlled temperature described in connection with Embodiment 1 may be effected as the control of the discharge amount.

(Embodiment 3)

As Embodiment 3, description will now be made of a printing method of emphasizing the density of black on the basis of Japanese Laid-Open Patent Application No. 3-129502 already proposed by the inventors as a printing method effective to eliminate blur and density irregularity during printing on plain paper.

Figure 4:
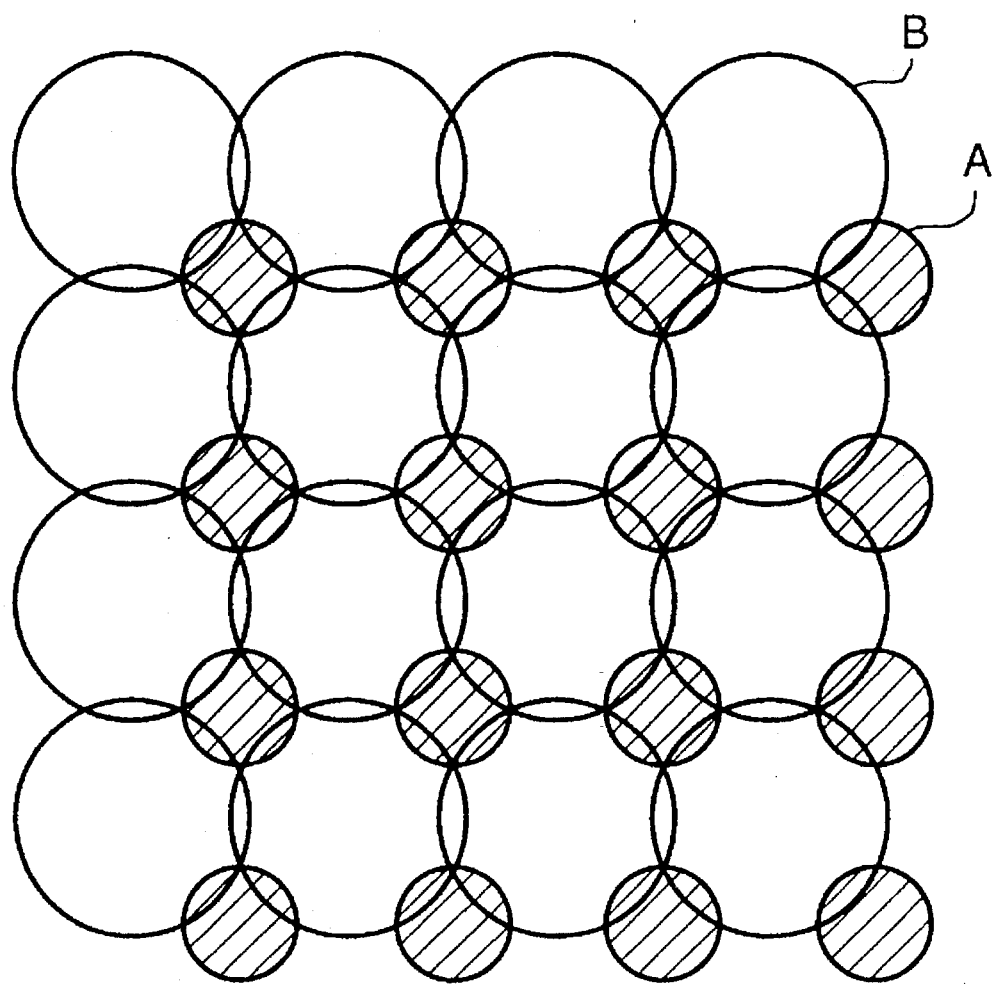
FIG. 4 shows the printing state of Embodiment 3 of the present invention.
Figure 5:
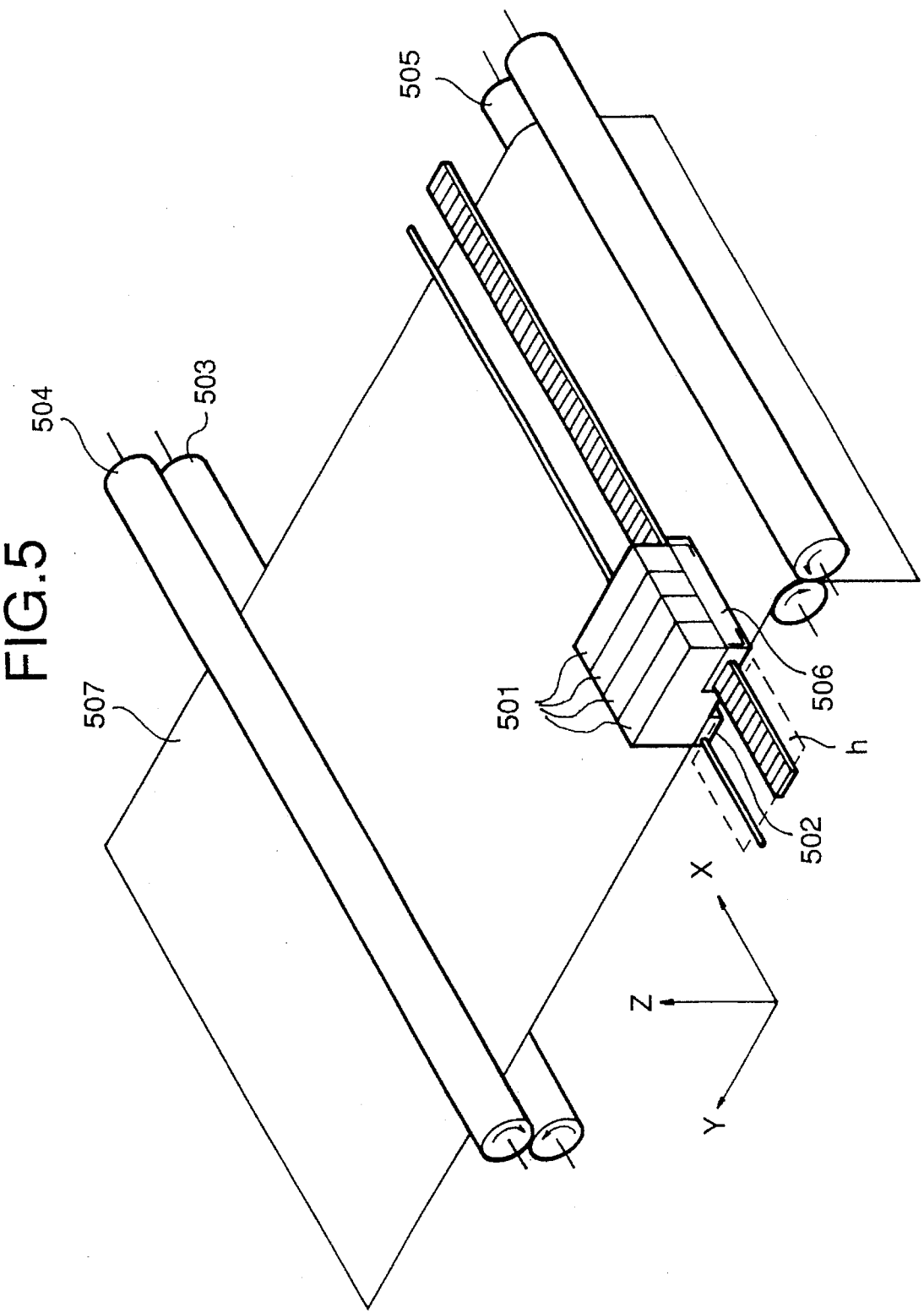
FIG. 5 is a pictorial perspective view showing the recording portion of an ink jet printer to which the present invention is applicable.
Figure 6:
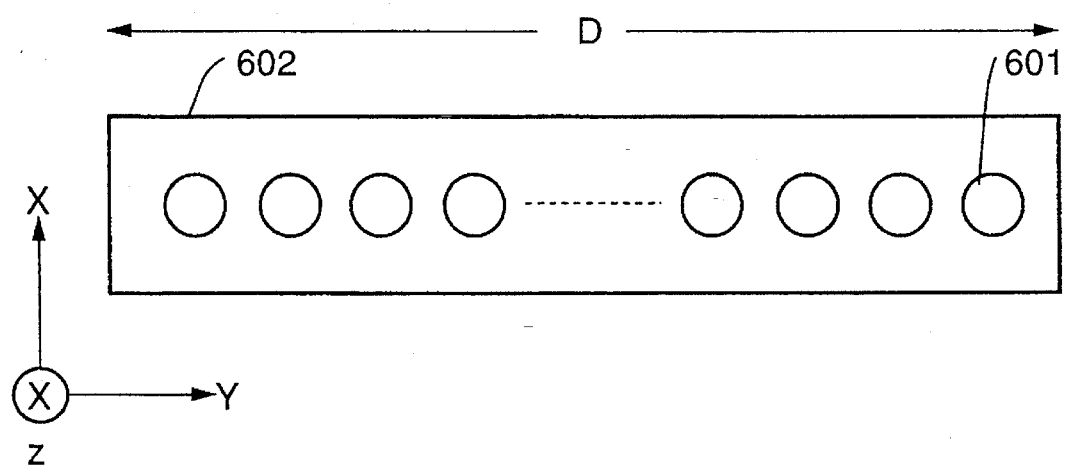
FIG. 6 shows the details of the multihead of FIG. 5.
Figure 11A:
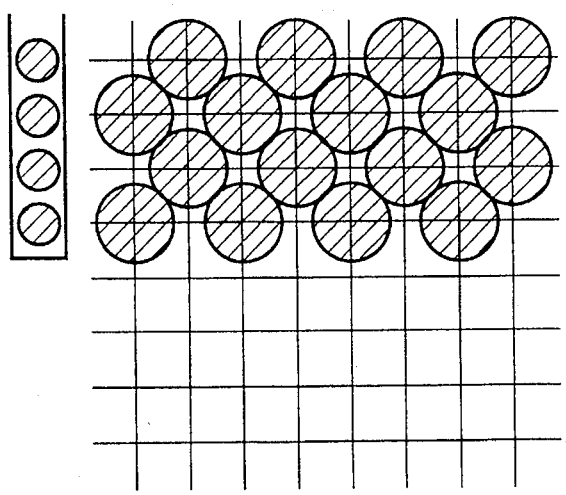
FIGS. 11A to 11C illustrate divisional printing in Embodiment 1.
Figure 11B:
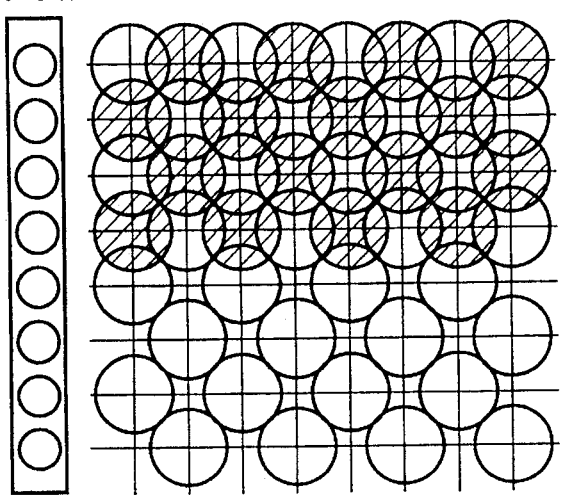
Figure 11C:
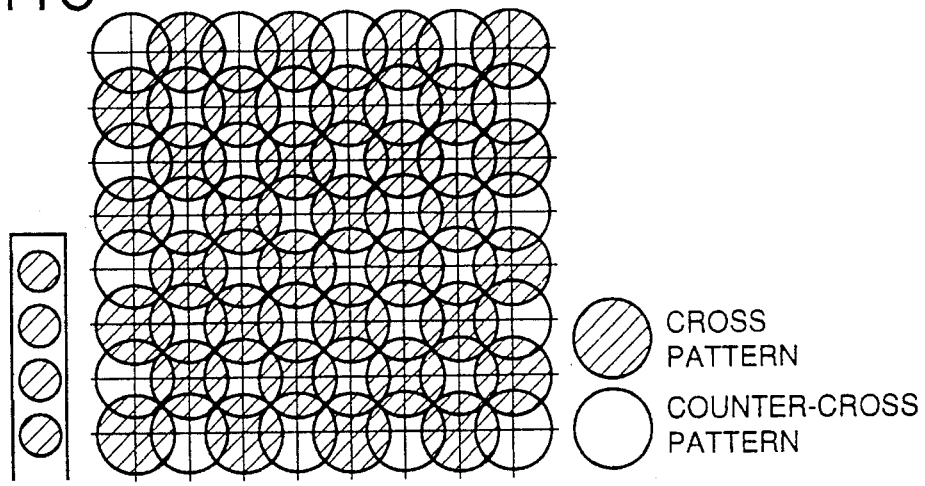

According to this proposal, a picture element is formed by two dots differing in discharge amount from each other by the use of paper feeding at ½ picture element unit and the control of the discharge amount by the PWM control described in connection with Embodiment 2, whereby a printed state as shown in FIG. 4 is brought about.

Here, for simplicity, it is to be understood that by the use of the PWM control (FIG. 3) of Embodiment 2, a dot A is printed by a discharge amount Va and a dot B is printed by a discharge amount Vb. According to the above-mentioned proposal, the heads of all colors likewise effect the printing of FIG. 4, but in the present embodiment, this is limited to the case of the color graphic mode. Another independent printing sequence is used in the monochromatic character mode wherein black must be emphasized. It is to be understood that as means for discriminating between and executing these two modes, use is made of the method as described in connection with FIG. 7 as in Embodiment 1.

In the monochromatic character mode wherein black is emphasized, c and m are impacted as dots B at the black image data positions during the same scan as that for k. However, the discharge amounts of c and m are made smaller than the discharge amount of black. Thereby, the amount of impacted ink becomes 24.0+20.0×2 pl/dot for the dot β alone, and adjacent dots β overlap each other and the area factor can satisfy 100%.

Accordingly, it becomes unnecessary to print the dots A, that is, the paper feeding at ½ picture element unit becomes unnecessary and thus, printing is completed by one scan instead of by several cycles of divisional printing being done per unit area. If this is done, the effect in the above-mentioned proposal can be realized in the color graphic mode and at the same time, an image having high density of black can be obtained without time cost in the monochromatic character mode as well. Further, the hue of black becomes good.

Also, according to the present embodiment, it becomes unnecessary to momentarily change the setting of the discharge amounts of c, m and y multiheads within the same scan as is done in Embodiment 2 and therefore, more stable discharge amount design becomes possible and images free of blur and having high density can be obtained stably.

What is claimed is:

1. An ink jet recording apparatus for discharging a plurality of different colored inks, to thereby record color images on a recording medium, comprising:

a plurality of recording heads having a number of discharge ports through which the inks are discharged therefrom, and a number of discharge means for discharging corresponding to said number of discharge ports, said recording heads including a recording head for discharging black ink ;and discharge amount control means for controlling an amount of ink discharged from each of said recording heads;

wherein, for a recording portion to be printed in black, the black ink and at least one color ink other than black are discharged and said discharge amount control means makes an amount of the black ink discharged greater than the amount of the ink other than black.

2. An ink jet recording apparatus according to claim 1, wherein discharge amounts of the at least one color ink are such that dots formed by the discharge of the at least one color ink partly overlap respective adjacent dots and a gap is created at least between said formed dot and said adjacent dots.

3. An ink jet recording apparatus according to claim 1, wherein the at least one color ink includes cyan and magenta.

4. An ink jet recording apparatus according to claim 1, further comprising:

head temperature detecting means for detecting temperatures of the heads; and temperature regulating means for regulating the temperatures of the heads based on said head temperature detecting means;

said discharge amount control means controlling discharge amounts by said temperature regulating means.

5. An ink jet recording apparatus according to claim 1, further comprising:

scanning means for causing the heads to scan relative to said recording medium; and head driving means for supplying recording data to said plurality of recording heads during the relative scanning by said scanning means to thereby effect recording on said recording medium.

6. An ink jet recording apparatus according to claim 7, further comprising:

producing means for producing thinned recording data by thinning recording data supplied to said plurality of recording heads at a predetermined thinning rate;

discriminating means for discriminating whether the recording data supplied to said plurality of recording heads comprise a predetermined color or a plurality of colors; and selecting means for selecting, based on said discriminating means, a character printing mode in which recording data comprising said predetermined color are recorded and when said plurality of colors are discriminated a graphic printing mode in which the thinned recording data by said producing means are supplied to effect recording.

7. An ink jet recording apparatus according to claim 6, wherein said scanning means causes said plurality of recording heads to scan relative to said recording medium a plurality of times.

8. An ink jet recording apparatus according to claim 6, wherein said scanning means causes the different discharge ports of said plurality of recording heads to scan relative to same area of said recording medium a plurality of times.

9. An ink jet recording apparatus according to claim 6, wherein when said plurality of recording heads scan relative to a same area of said recording medium a plurality of times, said producing means thins in a pattern differing from said recording data during each said relative scan to thereby produce the thinned recording data.

10. An ink jet recording apparatus according to claim 6, wherein said selecting means selects by manual operation.

11. An ink jet recording apparatus according to claim 6, wherein said discriminating means effects discrimination for each recording datum of the recording data supplied to the recording heads which corresponds to one scan by said scanning means.

12. An ink jet recording apparatus according to claim 1, wherein said plurality of recording heads induce a state change including formation of bubbles in the inks by thermal energy, and discharge the inks based on said state change.

13. An ink jet recording apparatus according to claim 1, wherein said recording heads have head temperature detecting means for detecting temperatures of the heads, said number of discharge means discharge the ink therefrom by a driving signal being imparted thereto, said driving signal comprises a first driving signal and a second driving signal, and said discharge amount control means controls the discharge amount by waveform modulating means for modulating a waveform of said first driving signal based on said head temperature detecting means.

14. An ink jet recording apparatus according to claim 13, wherein said waveform modulating means changes a pulse width of said first driving signal.

15. An ink jet recording apparatus according to claim 1, further comprising:

scanning means for causing said plurality of recording heads to scan in a scan direction relative to the recording medium;

sub-scanning means for causing said recording medium to scan relative to said plurality of recording heads in a direction orthogonal to the scan direction;

head driving means for supplying recording data to said plurality of recording heads during the relative scanning by said scanning means to thereby effect recording on said recording medium; and discriminating means for discriminating whether the recording data supplied to said plurality of recording heads comprise a predetermined color or a plurality of colors;

wherein when based on said discriminating means, said recording data comprise the plurality of colors, two kinds of ink discharge are effected to one picture element area of basic picture elements of said ink jet recording apparatus, and at least one of said two kinds of ink discharge is small in amount relative to the other.

16. An ink jet recording apparatus according to claim 15, wherein said two kinds of ink discharge are discharged toward locations spaced apart by ½ picture element from each other relative to the scanning direction of said scanning means and the scanning direction of said sub-scanning means.

17. An ink jet recording apparatus according to claim 16, wherein discharge amounts of one of said two kinds of ink discharges is set such that a first dot formed by the ink discharge partly overlaps respective adjacent dots and a gap is created at least between the first dot and the adjacent dots, and discharge amount of the other kind of ink discharge is set such that second dots formed by the ink discharge fills the area of at least said gap.

18. An ink jet recording apparatus for discharging a plurality of different colored inks, to thereby record color images on a recording medium, comprising:

a plurality of recording heads having a number of discharge ports through which the inks are discharged therefrom, and a number of discharge means for discharging the inks corresponding to said number of discharge ports, said recording heads including a head for discharging black ink, scanning means for scanning said recording heads over said recording medium;

head driving means for supplying a driving data to said recording heads during scanning of said scanning means and for forming an image on said recording medium;

discharge amount control means for controlling an amount of ink discharged from each of said recording heads;

selection means for selecting either of a first recording mode in which the driving data is only constituted by a black color and a second recording mode in which the driving data is constituted by a plurality of different colors; and recording control means for, in the first recording mode, discharging the black ink and at least one color ink other which is not the black ink to a recording portion to be printed black and said discharge amount control means making a discharge amount of the black ink larger than an amount of the ink which is not the black ink and, in the second recording mode, making a discharge amount of the ink from said recording heads substantially equal to each other.

19. An ink jet recording apparatus according to claim 18, wherein discharge amounts of the at least one color ink are set such that dots formed by the discharge of the at least one color ink partly overlap respective adjacent dots and a gap is created at least between said formed dot and said adjacent dots.

20. An ink jet recording apparatus according to claim 18, which is provided with different recording heads for four colors and wherein the at least one color ink includes cyan and magenta.

21. An ink jet recording apparatus according to claim 18, wherein amounts of inks discharged from said plurality of recording heads are set such that dots formed by the discharged inks partly overlap respective adjacent dots and respective dots located diagonally.

22. An ink jet recording apparatus according to claim 18, wherein said recording heads have head temperature detecting means for detecting temperatures of the heads, said number of discharge means discharge the inks therefrom by a driving signal being imparted thereto, said driving signal comprises a first driving signal and a second driving signal, and said discharge amount control means controls the discharge amount by waveform modulating means for modulating a waveform of said first driving signal based on said head temperature detecting means.

23. An ink jet recording apparatus according to claim 22, wherein said waveform modulating means changes a pulse width of said first driving signal.

24. An ink jet recording apparatus according to claim 18, wherein said plurality of recording heads induce a state change including formation of bubbles in the inks by thermal energy, and discharge the inks based on said state change.

25. An ink jet recording apparatus according to claim 18, further comprising discrimination means for discriminating whether the driving data supplied to said plurality of recording heads is constituted only by black color data or by a plurality of different colors, wherein said selection means selects said first mode or said second mode in accordance with said discrimination means.

26. An ink jet recording apparatus according to claim 25, wherein said discrimination means discriminates to a driving data of a predetermined recording area and said selection means selects one of said recording modes to each said predetermined recording area.

27. An ink jet recording apparatus according to claim 26, wherein said predetermined recording area is a sheet of recording medium.

28. An ink jet recording apparatus according to claim 26, wherein said predetermined recording area is a recording area for scanning said plurality of recording heads in one stroke by said scanning means.

29. In an ink jet recording apparatus provided with a plurality of recording heads for discharging a plurality of different color inks therefrom, and discharge amount control means for controlling an amount of ink discharged from each of said recording heads, a method of recording a predetermined color of the inks of said different colors comprising:

a first step of supplying recording data of black color to one of said recording heads which discharges black ink to thereby effect recording on a recording medium; and a second step of supplying the recording data of said black color to at least one of said recording heads which discharge inks which are of colors other than black, to thereby superpose and record the inks of said other color on a same portion to be recorded by the black ink;

the discharge amount of the black ink being substantially larger than the discharge amount of the inks of said other colors.

30. A method according to claim 29, wherein the inks of said other colors include cyan and magenta.

31. An ink jet recording method for recording color images on an recording medium, comprising the steps of:

providing a plurality of recording heads having a number of discharge ports through which the inks are discharged therefrom, and a number of discharge means for discharging ink corresponding to said number of discharge ports, said recording heads including a head for discharging black ink;

scanning said recording heads over said recording medium;

supplying image data to said recording heads during scanning for forming an image on said recording medium;

controlling an amount of ink discharged from each of said recording heads;

selecting either a first recording mode in which the image data is only constituted by black color and a second recording mode in which the image data is constituted by a plurality of different colors; and controlling, in the first recording mode, discharging of the black ink and at least one color ink which is not the black ink to a recording portion to be printed black and making the discharge amount of the black ink larger than the amount of the ink which is not the black ink and, in the second recording mode, making the discharge amount of the ink from said recording heads substantially equal.

* * * * *

UNITED STATES PATENT AND TRADEMARK OFFICE
CERTIFICATE OF CORRECTION

PATENT NO. : 5,488,398
DATED : January 30, 1996
INVENTOR(S) : Miyuki Matsubara et al.

It is certified that error appears in the above-indentified patent and that said Letters Patent is hereby corrected as shown below:

On the title page:
Item [56] Reference Cited

Foreign Patent Documents,
"93367 4/1989 Japan." and "129502 6/1991 Japan."
should be deleted.

COLUMN 2

Line 32, "is" should read --in--.
Line 46, "the" should read --be--.

COLUMN 3

Line 7, "suppress ed." should read --suppressed.--.
Line 10, " the" should read --show the--.

COLUMN 6

Line 58, "others" should read --other--.

COLUMN 9

Line 3, "and further" should be deleted.

COLUMN 10

Line 13, "ink ;and" should read --ink; and--.
Line 49, "claim 7," should read --claim 5,--.

COLUMN 11

Line 6, "same" should read --a same--.

UNITED STATES PATENT AND TRADEMARK OFFICE
CERTIFICATE OF CORRECTION

PATENT NO. : 5,488,398
DATED : January 30, 1996
INVENTOR(S) : Miyuki Matsubara et al.

It is certified that error appears in the above-indentified patent and that said Letters Patent is hereby corrected as shown below:

COLUMN 12

Line 4, "amount" should read --amounts--.
Line 5, "fills" should read --fill--.
Line 33, "other" should be deleted.
Line 44, "dot" should read --dots--.
Line 51, "inks" should read --the inks--.

COLUMN 14

Line 9, "an" should read --a--.

Signed and Sealed this

Sixth Day of August, 1996

*Attest:*

BRUCE LEHMAN

*Attesting Officer*  Commissioner of Patents and Trademarks